United States Patent
Annavaram et al.

(10) Patent No.: US 9,008,735 B2
(45) Date of Patent: Apr. 14, 2015

(54) RUNTIME SELECTION OF MOST ENERGY-EFFICIENT APPROACH FOR SERVICES REQUESTED BY MOBILE APPLICATIONS

(71) Applicants: Murali Annavaram, Los Angeles, CA (US); Sangwon Lee, Los Angeles, CA (US)

(72) Inventors: Murali Annavaram, Los Angeles, CA (US); Sangwon Lee, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 57 days.

(21) Appl. No.: 13/861,140

(22) Filed: Apr. 11, 2013

(65) Prior Publication Data
US 2013/0275794 A1 Oct. 17, 2013

Related U.S. Application Data

(60) Provisional application No. 61/622,981, filed on Apr. 11, 2012.

(51) Int. Cl.
*G06F 1/32* (2006.01)
(52) U.S. Cl.
CPC ............... *G06F 1/3234* (2013.01); *Y02B 60/50* (2013.01); *G06F 1/3278* (2013.01)
(58) Field of Classification Search
USPC .......................... 455/450, 522, 557, 572, 574
See application file for complete search history.

(56) References Cited

U.S. PATENT DOCUMENTS

| | | |
|---|---|---|
| 6,975,941 B1 | 12/2005 | Lau et al. |
| 7,093,147 B2 | 8/2006 | Farkas et al. |
| 7,227,847 B2 | 6/2007 | Gluck |
| 7,607,032 B1 | 10/2009 | Marek et al. |
| 7,751,827 B2 | 7/2010 | Poykko et al. |

(Continued)

FOREIGN PATENT DOCUMENTS

| | | |
|---|---|---|
| JP | 2000155626 A | 6/2000 |
| JP | 2010072757 A | 4/2010 |

OTHER PUBLICATIONS

Anand, B. et al. 2010. ARIVU: Power-Aware Middleware for Multiplayer Mobile Games. Network and Systems Support for Games (NetGames), 2010 9th Annual Workshop, Nov. 16-27, 2010, pp. 1-6.

(Continued)

*Primary Examiner* — Sam Bhattacharya
(74) *Attorney, Agent, or Firm* — McDermott Will & Emery LLP

(57) ABSTRACT

An energy conservation module may be included in a mobile communication device that receives requests for services from application programs running in the device. For each request, the energy conservation module may determine which of different, selectable ways of performing the request is likely to be the most energy efficient. The energy conservation module may then cause the request to be performed in this most energy-efficient way. This determination may be dynamic and based on current operating conditions. Middleware between the application programs and an operating system may be included that presents various APIs to the application programs to allow them to easily invoke this functionality. The different, selectable ways of performing the services may be of any type, including different, selectable computer network interfaces (e.g., Wi-Fi and cellular) and whether a complex computation should be performed within or outside of the mobile communication device.

22 Claims, 9 Drawing Sheets

(56) References Cited

U.S. PATENT DOCUMENTS

| | | | |
|---|---|---|---|
| 7,853,812 | B2 | 12/2010 | McBrearty et al. |
| 7,949,349 | B2 | 5/2011 | Menjo et al. |
| 8,081,963 | B2 | 12/2011 | Aftab et al. |
| 2004/0192352 | A1 | 9/2004 | Vallstrom et al. |
| 2007/0208956 | A1 | 9/2007 | Lin et al. |
| 2009/0241122 | A1 | 9/2009 | Wong |
| 2009/0278738 | A1 | 11/2009 | Gopinath |
| 2009/0293061 | A1 | 11/2009 | Schwinn et al. |
| 2011/0055831 | A1 | 3/2011 | Heller, Jr. |
| 2011/0183626 | A1 | 7/2011 | Das et al. |
| 2011/0289507 | A1 | 11/2011 | Khan et al. |
| 2011/0296418 | A1 | 12/2011 | Kim et al. |
| 2013/0136164 | A1* | 5/2013 | Ronc ............... 375/224 |

OTHER PUBLICATIONS

Bareth, U. et al. 2011. Energy-Efficient Position Tracking in Proactive Location-Based Services for Smartphone Environments. Computer Software and Applications Conference (COMPSAC), 2011 IEEE 35th Annual, Jul. 18-22, 2011, pp. 516-521.

Kim, K.-H. et al. 2011. Improving Energy Efficiency of Wi-Fi Sensing on Smartphones. INFOCOM, 2011 Proceedings IEEE, Apr. 10-15, 2011, pp. 2930-2938.

Murarasu, A.F. et al. 2009. Mobile Middleware Solution for Automatic Reconfiguration of Applications. In Information Technology: New Generations, 2009. ITNG '09, Sixth International Conference on, Apr. 27-29, 2009, pp. 1049-1055.

Rodriguez, J. et al. 2010. Cognitive Radio and Cooperative Strategies for Power Saving in Multi-standard Wireless Devices. Future Network and Mobile Summit, Jun. 16-18, 2010, pp. 1-8.

* cited by examiner

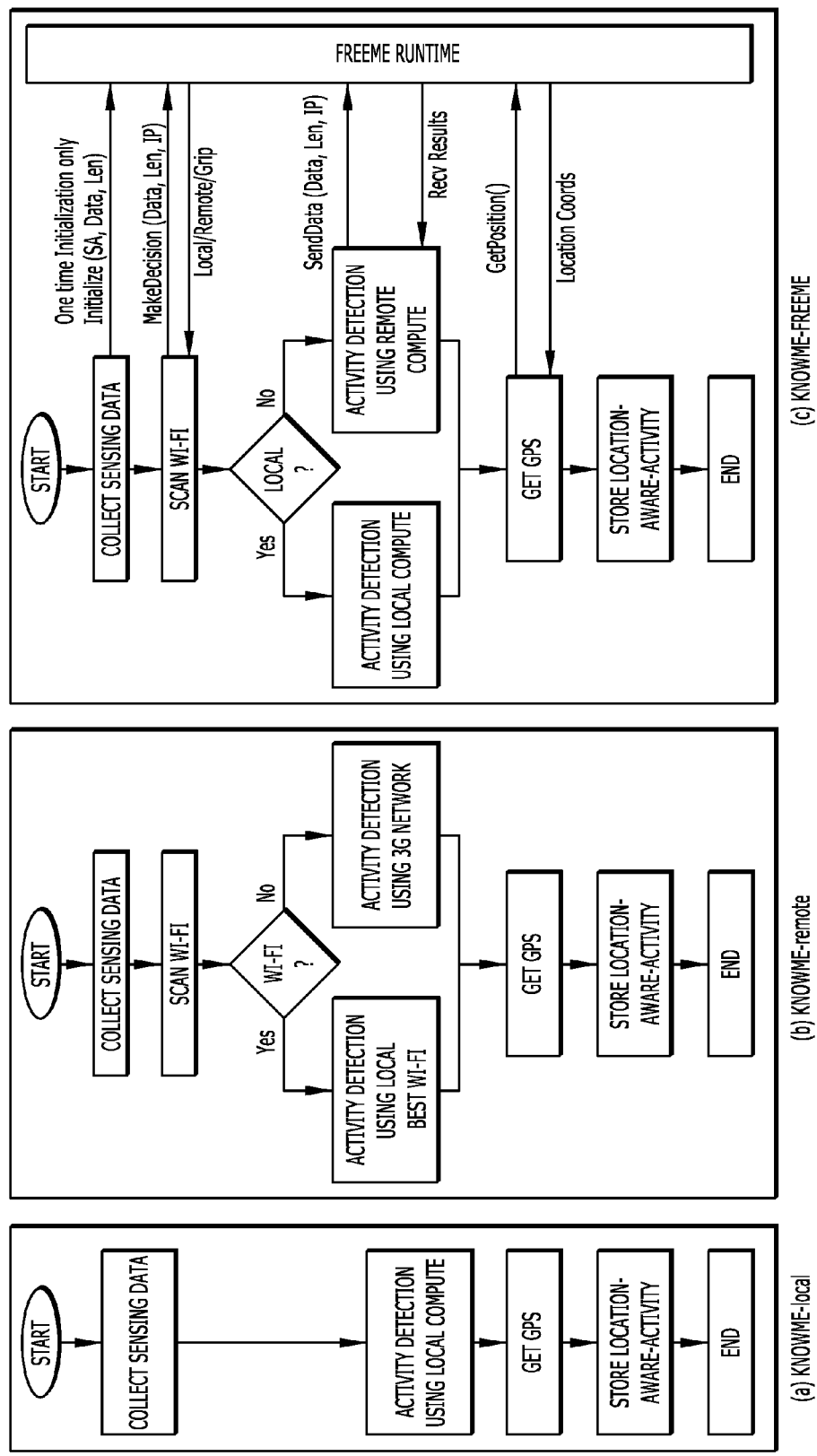
FIG. 8A (a) KNOWME-local
FIG. 8B (b) KNOWME-remote
FIG. 8C (c) KNOWME-FREEME ical Field This disclosure relates to mobile communication devices and to energy saving approaches for minimizing the energy consumed by such devices.

2. Description of Related Art

The surging popularity of mobile devices has created an entirely new software market for mobile applications. Many mobile phone applications rely on network communications and data processing to provide automated and personalized services, such as context or location based services. Given the very low entry barrier for mobile application development, there are many application developers who focus primarily on application functionality.

But battery life of a mobile phone can be a critical bottleneck to the end-user experience of using an application. For example, a Nokia N95 phone battery has been reported to have dozens of hours of standby time, but when used for context monitoring by sensing audio, GPS and Wi-Fi access points, the battery has been reported to drain in 4 hours. As mobile applications become pervasive, the limited battery problem may only get worse as multiple applications may in fact access the same hardware independently at different time intervals.

At each stage of a mobile application design and operation, the application developer has a wide range of options to trade-off battery life of a mobile phone for other important metrics. For instance, many mobile devices provide multiple different approaches for interfacing with a computer network such as the Internet. These may include, for example, a Wi-Fi interface and a cellular interface. Similarly, there may be choices over whether data computations are performed within or outside of the mobile device. Each of these choices may consume different amounts of energy. Unfortunately, writing application programs that make the most energy-efficient choice can be costly and very difficult.

SUMMARY

An energy conservation module may be included in a mobile communication device that receives requests for services from application programs running in the device. For each request, the energy conservation module may determine which of different, selectable ways of performing the request is likely to be the most energy efficient. The energy conservation module may then cause the request to be performed in this most energy-efficient way. This determination may be dynamic and based on current operating conditions. Such an energy conservation module may be implemented as middleware between the application programs and an operating system. The middleware may present various APIs to the application programs to allow them to easily invoke this functionality. Application programmers may thus be freed from having to include code in their applications that make these energy conservation determinations. A higher degree of energy savings may also be realized when the energy conservation module is implemented as a middleware. The different, selectable ways of performing the services may be of any type, including different, selectable computer network interfaces (e.g. Wi-Fi and cellular) and whether a complex computation should be performed within or outside of the mobile communication device.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8A illustrates where activity classification was done locally on a phone.

FIG. 8B illustrates where activity classification was done remotely on a server. FIG. 8C illustrates where activity classification was dynamically switched between local and remote computation as determined by the energy conservation module.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
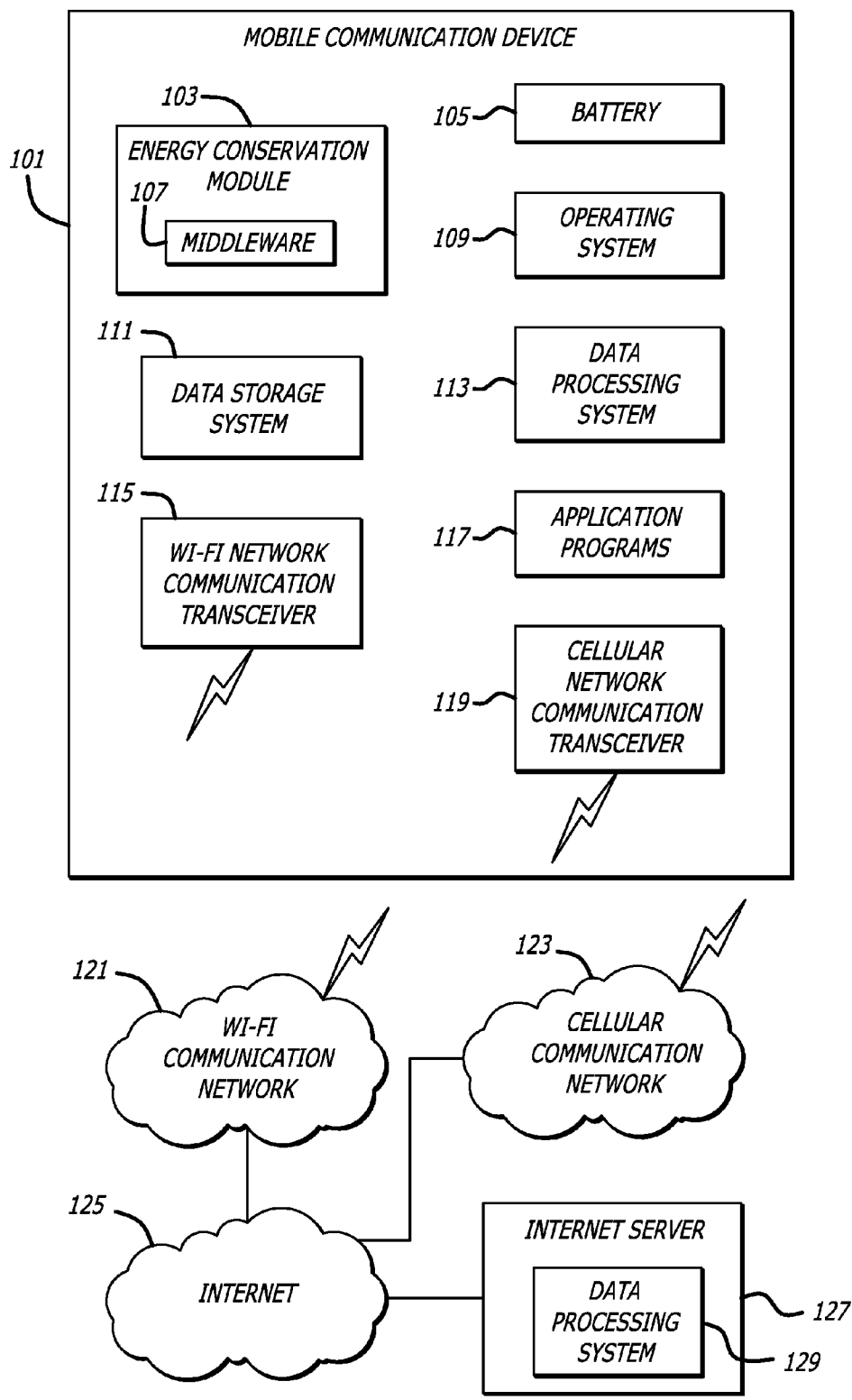
FIG. 1 illustrates a mobile communication device containing an energy conservation module and other components, along with related network communication systems and an Internet server.

FIG. 1 illustrates a mobile communication device 101 containing an energy conservation module 103 and other components, along with related network communication systems and an Internet server 127.

The mobile communication device 101 may be of any type. For example, the mobile communication device 101 may consist of or include a cell phone, a smart phone, a tablet, a laptop computer, and/or a netbook.

The mobile communication device 101 may include a battery 105, an operating system 109, a data storage system 111, a data processing system 113, a Wi-Fi network communication transceiver 115, application programs 117, and a cellular network communication transceiver 119. The Wi-Fi network communication transceiver 115 may communicate with a Wi-Fi communication network 121 which may provide a gateway to the Internet 125. Similarly, the cellular network communication transceiver 119 may communicate with a cellular communication network 123 that may provide a gateway to the Internet.

The energy conservation module 103 may include computer hardware and software having a configuration that performs the functions of the energy conservation module 103 that are described herein.

The energy conservation module 103 may have a configuration that maximizes the energy efficiency of the mobile communication device 101 while the mobile communication device 101 is running one or more of the application programs 117. Some of the application programs 117 may communicate over a computer network, such as the Internet 125, via one of different, selectable computer network interfaces, such as the Wi-Fi network communication transceiver 115 in the cellular network communication transceiver 119.

The energy conservation module 103 may have a configuration that receives requests from each of the application programs 117 while they are running. Each request may call for data communication over the computer network. For each received request, the energy conservation module 103 may be configured to determine which of the selectable computer network interfaces that are operational at the time of receiving the request is likely to consume the least amount of energy handling the data communication that is called for by the request. The energy conservation module 103 may have a configuration that causes the requested data communication to take place via the computer network interface that is determined likely to consume the least amount of energy handling the data communication.

The data storage system 111 may have a configuration that stores information indicative of the energy consumption rate of each of the selectable computer network interfaces, such as the energy consumption rate of the Wi-Fi network communication transceiver 115 and the energy consumption rate of the cellular network communication transceiver 119. The energy conservation module 103 may have a configuration that examines the stored information when determining which of the selectable computer network interfaces is likely to consume the least amount of energy.

The determination by the energy conservation module 103 of which selectable computer network interfaces is likely to consume the least amount of energy may take into consideration the current status of one or more operating conditions that vary over time, such as the current response times, available data bandwidth, or network congestion associated with each of the operating computer network interfaces, such as the current response times, available data bandwidth, or network congestion of the Wi-Fi network communication transceiver 115 and the cellular network communication transceiver 119. This information can also change based on location.

The energy conservation module 103 may include middleware 107, which may be software, that is juxtaposed between the operating system 109 and each of the application programs 117. The middleware 107 may have a configuration that receives requests for data communications from the application programs 117 via one or more APIs.

The energy conservation module 103 may also have a configuration that receives requests from each of the application programs 117 for data processing. For each request, the energy conservation module 103 may have a configuration that determines whether the data processing is likely to consume the least amount of energy if substantially performed by the data processing system 113 within the mobile communication device 101 or by a data processing system outside of the mobile communication device, such as a data processing system 129 located within the Internet server 127. The energy conservation module 103 may have a configuration that causes the data processing to be substantially performed at the location that is determined to consume the least amount of energy.

The energy conservation module 103 may perform the various functions described herein on an automated basis without user intervention following the receipt of a request for a service from an application program. In other configurations, user permission for a particular energy efficient choice may be sought before the choice is made.

Other Details

Various different approaches may be followed to implement one or more of the processes that have been described, as well as others. The energy conservation module 103 may also be configured to conserve energy in connection with the selection of other energy-consuming devices, such as sensors. Examples of these are now discussed.

As indicated, the runtime services provided by the energy conservation module 103 may be exposed to an application developer through APIs (Application Programming Interfaces). These APIs can be used by software developers to obtain system services. For instance, rather than directly accessing a GPS sensor or a specific radio for data transmission, the software designer may simply call the API to achieve the same functionality. The energy conservation module 103 may monitor the various energy tradeoffs and dynamically select the most energy efficient way to provide the necessary functionality. By allowing multiple applications to access the services through a centralized middleware 107 layer, moreover, it is also possible to amortize the energy cost of sensing.

The energy conservation module 103 has been implemented on a Symbian S60 platform currently and a mobile sensing application for physical activity detection was transformed to use it's API. Results from a field trial show that the energy conservation module 103 can improve battery life in this implementation between 6% and 21%.

Mobile phones may include on-board sensors, such as digital cameras, GPS, accelerometer, and gyroscope. Additional sensors, such as bio-sensors for heart rate and ECG, may also be integrated into a mobile phone using existing wireless standards.

Location can be sensed in multiple ways that trade-off location precision with energy efficiency. Context detection algorithms, such as user state, may dynamically vary sensor sampling rates to tradeoff accuracy of state detection with battery life. Similarly, there may be energy trade-off decisions on remote versus local computation.

The energy conservation module 103 may provide a mobile application development framework that relieves the developer from making energy efficiency tradeoff decisions, while the underlying framework may implement sensing, computation, and communication services in an energy efficient manner.

The energy conservation module 103 may operate at the interface between a user application and the operating system of the underlying platform. The energy conservation module 103 may service an application's demand for sensing, communication, and computation. The service provided by the energy conservation module 103 may be exposed to the application developer through APIs. In the presence of energy conservation module 103, an application programmer may not need to directly access any of the hardware sensing or communication infrastructure on the mobile phone. Instead, the functionality of the hardware may be exposed to the application software through APIs provided by the energy conservation module 103. For instance, rather than directly accessing the GPS sensor or doing computation locally on the phone, the software designer may simply invoke the energy conservation module 103's API to achieve the same functionality. The energy conservation module 103 may monitor the various energy tradeoffs and dynamically select the most energy efficient way to provide the necessary functionality.

The energy costs of a subset of sensing, computing, and communication tasks can be statically measured. The energy costs of such static choices can be measured once during initialization of the device. The energy conservation module 103 may then store the non-varying energy cost information in a non-volatile database on board the mobile phone, such as in the data storage system 111.

Some energy costs may change dynamically. For these choices, the energy conservation module 103 may use short profiling intervals to determine the most energy efficient method to achieve the desired task functionality. Energy efficient methods that are identified at runtime by the energy conservation module 103 may be stored in a runtime database which can be used for future decision making without the need for continuous profiling, such as the data storage system 111. The energy conservation module 103 may further improve energy efficiency by allowing multiple applications to access the same sensor data through its centralized runtime layer, thereby amortizing the energy cost, rather than duplicating them.

The energy conservation module 103 may, for example, be implemented on top of a Symbian S60 platform. A mobile sensing application for physical activity detection may be transformed to use the energy conservation module 103's API. Results from a nine hour field trial of this embodiment show that the energy conservation module 103 can improve battery life by up to 21%.

Model Used in Study

Figure 2:
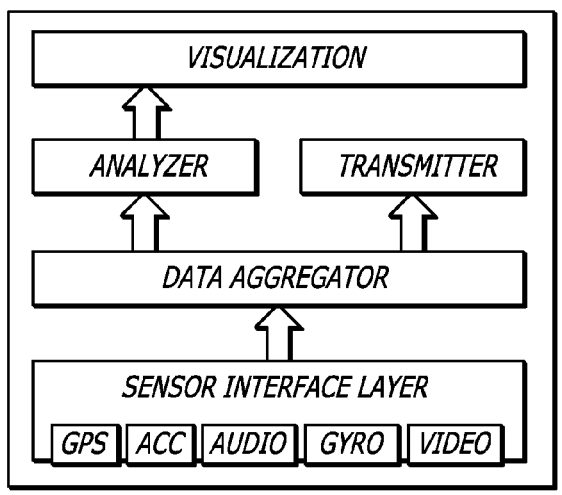
FIG. 2 illustrates another example of components that may be part of the energy conservation module and/or placed elsewhere in the mobile communication device.

FIG. 2 illustrates another example of components that may be part of the energy conservation module 103 and/or placed elsewhere in the mobile communication device 101. A mobile application may use all or a subset of this functionality.

As illustrated in FIG. 2, there may be a sensor interface layer 201. The sensor interface layer 201 may interface with each sensor and collect data from the sensor. The sensors interfaced can be both on-board (internal) sensors available on the mobile communication device 101 or external sensors that are connected to the mobile communication device 101 over a wireless interface, such as Bluetooth, or over a wired interface. A data aggregator 203 may receive sensor data from each sensor interface and combine them into a single sensor data record. The data aggregator 203 may allow multiple sensor streams to be synchronized into a single time stamped sensor record.

An analyzer module 205 may perform domain specific tasks. The analyzer module 205 may process the sensor data record and take action based on sensor data. For instance, in a mobile race game controlled by the tilt direction and tilt angle of the mobile phone, the analyzer module 205 may use gyroscope and accelerometer sensor data to compute the acceleration and angle. The data may then be used to change the game scene appropriately on the screen. In more complex sensing based applications, such as continuous user state monitoring, the analyzer module 205 may perform user state classification using data from both internal and external sensors.

A transmitter module 207 may access a backend web service to provide context-specific information. In some applications, the transmitter module 207 may send all the sensor data to a backend server which may then compute the user context remotely. The transmitter module 207 may also handle data compression and encryption for privacy and energy saving.

A visualization agent 209 may be used in graphics intensive applications to render video or graphics on screen.

The software components illustrated in FIG. 2 were placed in an experimental mobile sensing platform for location-aware physical activity detection. The mobile platform was a Nokia E75 mobile phone, an external electrocardiograph sensor (ECG) for detecting user heart rate, and two internal sensors from the mobile phone, namely accelerometer (ACC) and GPS. A mobile application was run on the E75 and collected the sensor data. The sensor data was analyzed to classify user state into one of several activities, namely walking, running, fidgeting, standing, sitting, and using ECG and ACC sensor data with multi-modal signal processing as described. The user state classification was geo-stamped and stored in the mobile phone to provide continuous feedback to the end user regarding their physical activity level.

Energy Consumption of GPS

GPS may be used in many mobile applications, particularly location based services. Mobile phones may provide multiple options for sensing location information. For example, when using Nokia Phones, the user may have choices that include Bluetooth based external GPS, assisted GPS, traditional GPS with no assist, and network-based GPS that uses only cell towers to provide approximate position information.

FIG. 3A-D illustrate examples of energy consumption when GPS is processing a first request using each of these approaches, respectively. The figures shows tradeoffs in the power consumption and the time to obtain the first GPS reading using all four methods.

Figure 3A:
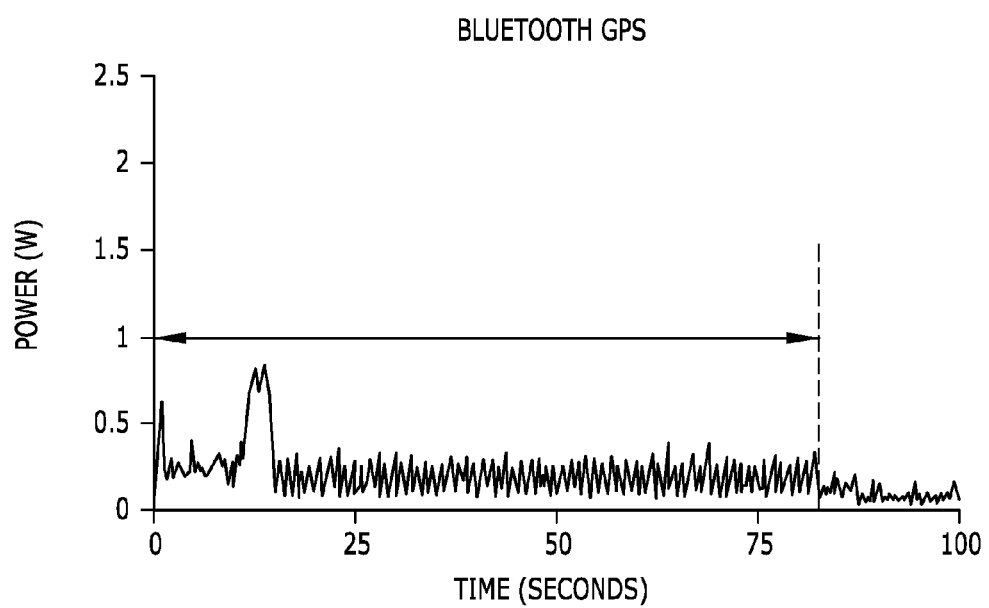
FIG. 3A-D illustrate examples of energy consumption when GPS is processing a request using different approaches.

In FIG. 3A, Bluetooth based external GPS power consumption shows only the mobile phone power consumption for establishing a Bluetooth link and to read the GPS coordinates. There is a spike in the power consumption when the connection is established, the data is read over the Bluetooth channel, and the power consumption drops down to idle Bluetooth power when Bluetooth is ON, but not actively sending/receiving data.

Figure 3B:
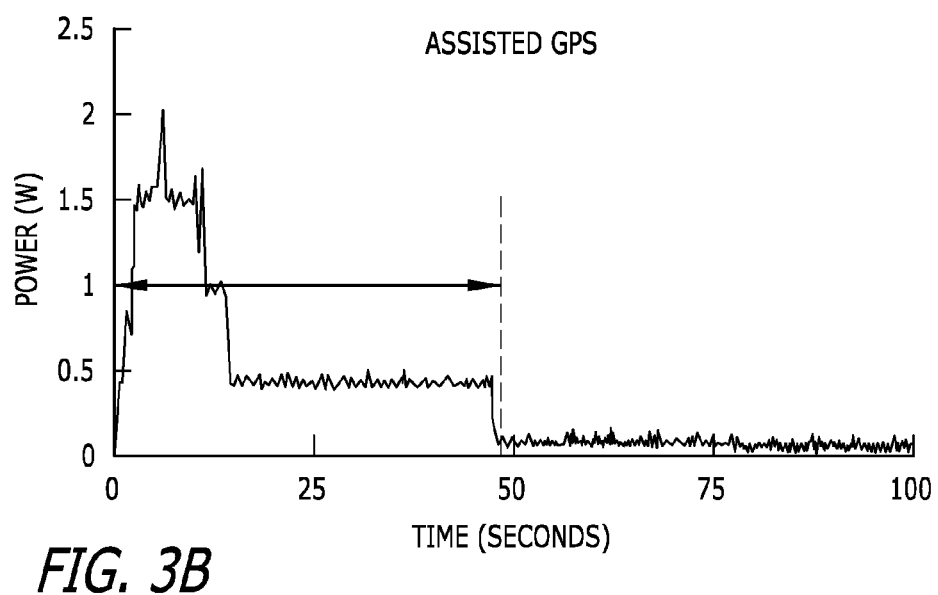

The assisted GPS curve in FIG. 3B shows a large power spike when it communicates with the cell tower to get the rough location first. Once the cell tower provides the orbital data of GPS satellites, the GPS receiver on the mobile phone can narrow the search for satellite signals and quickly obtain the position information. This approach took roughly 15 seconds to receive the position information from the network and an additional 35 seconds to compute the precise position from a cold start.

Figure 3C:
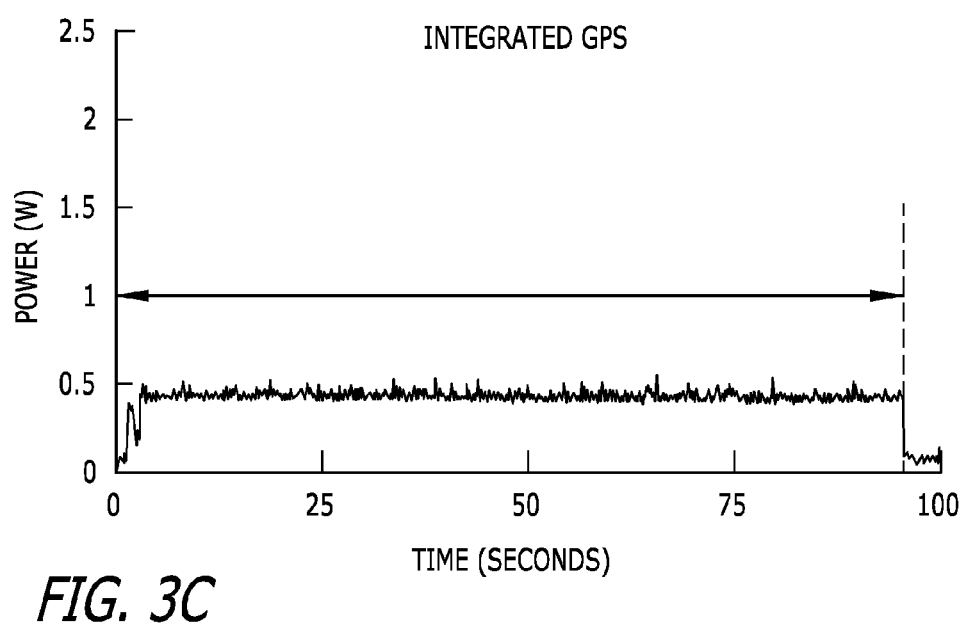

The curve in FIG. 3C used GPS built in a phone. In this mode, the GPS receiver continuously scans for satellite information. This approach uses lower peak power, but takes nearly 100 seconds before obtaining the position information due to the absence of any assistance from the cellular network. The total energy consumed by Integrated GPS was 33.9 Joules.

Figure 3D:
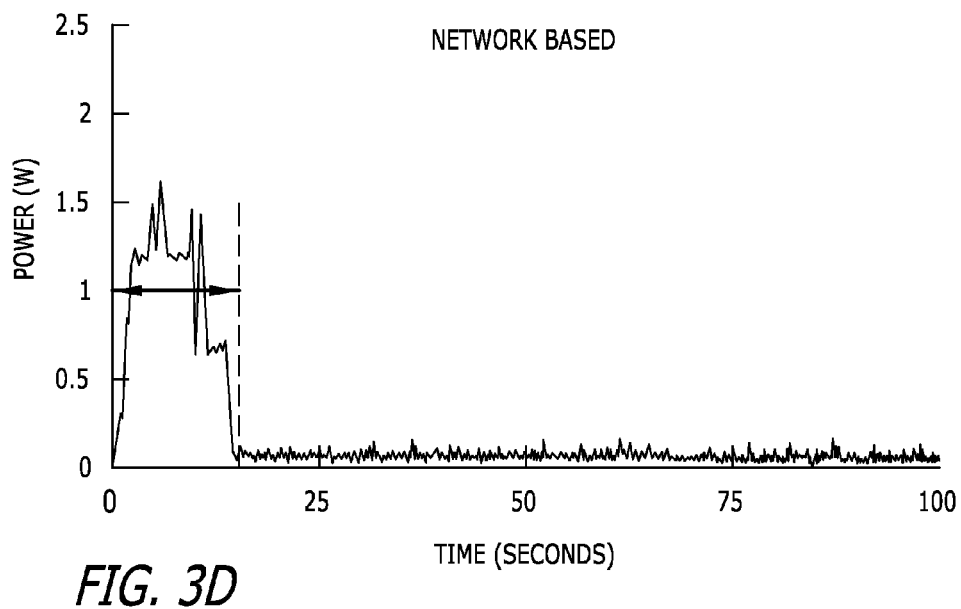

The last curve in FIG. 3D shows the power consumption of Network based position information which, like Assisted GPS, communicates with cell towers to triangulate its approximate position information, but no further communication with satellites is used. Hence, network-based GPS may also consume the same power as Assisted GPS initially when communicating with the cell tower for the first 15 seconds. The power consumption may then drop to idle power since it does not try to compute accurate position information by communicating with the satellites.

Based on the total energy consumption (Power consumption*time to get GPS reading) the Network-based GPS was best for saving energy (13 Joules per sample), but the location data may be only approximate. Depending on the application's desire for location accuracy, the application developer may select an appropriate location sensing algorithm. Given that location based services are very popular, multiple mobile applications may independently access the GPS to obtain location information.

Communication Costs

Mobile applications that provide context-based services may use the context information to access a web service provided by a back-end server using one of the wireless radios for communication. To quantify the energy costs of communication, a test bed was created. The test bed could send data from the mobile phone to the backend server using 3 G, EDGE, or Wi-Fi. AT&T broadband network was used for 3 G and EDGE, while an 802.11g Linksys router was used for Wi-Fi. The data size transmitted to the back-end varied from 100 KB to 1000 KB. As the performance of mobile wireless networks varied from place to place and from carrier to carrier, all of the data transfer measurements from the same location were tested during early morning within one hour to reduce network congestion problems with other users. This study was repeated multiple times, but always at the same time of the day, to measure day to day variations.

Figure 4:
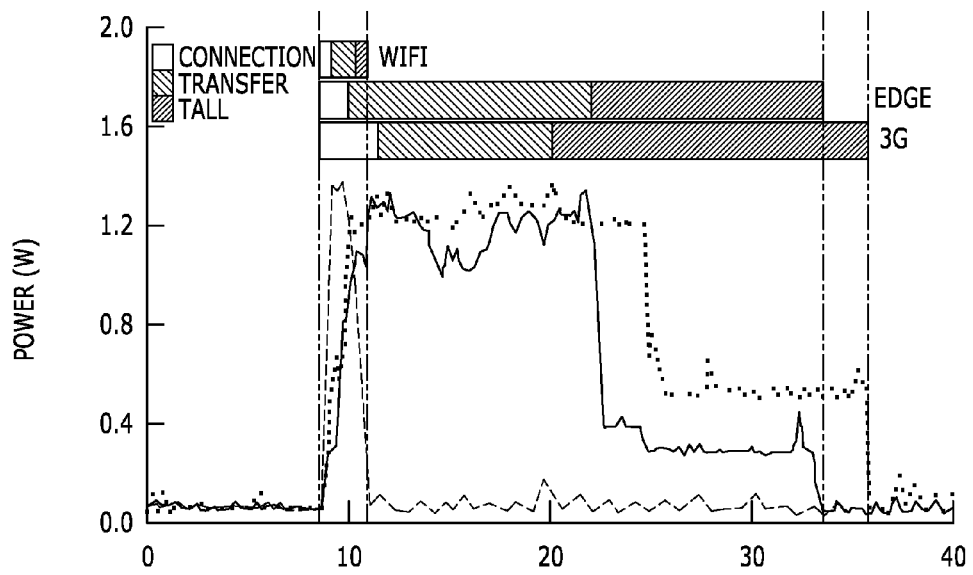
FIG. 4 shows power consumption during three data phases for three wireless data transmission approaches under one particular operating environment.

Data transmission may consist of three phases, namely a connection phase, a transfer phase and a tail phase. FIG. 4 shows power consumption during three data phases for three wireless data transmission approaches. In this experiment, a 200 KB data transfer was used. Due to shorter range, even though Wi-Fi has much higher bandwidth, the peak power consumed was only slightly worse than 3 G and EDGE radios on the E75.

Figure 5:
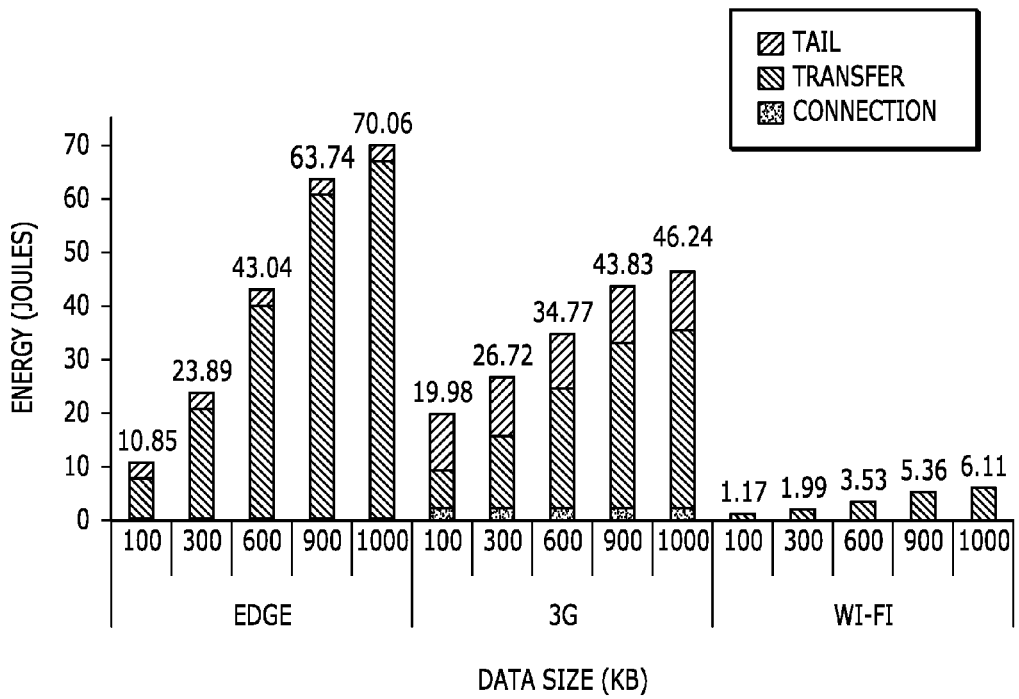
FIG. 5 shows data transmission (uplink) energy costs of three wireless interfaces as the size of data transfer was increased from 100 KB to 1000 KB under one particular operating environment.

FIG. 5 shows data transmission (uplink) energy costs of three wireless interfaces as the size of data transfer was increased from 100 KB to 1000 KB. Since Wi-Fi was tested during off-peak hours, it provided the highest bandwidth and was the most energy efficient across all data packet sizes. Hence, the overall energy consumption using Wi-Fi was significantly less than either 3 G/EGDE in this setup.

In this experiment, 3 G consumed more energy than EDGE until about 400 KB of data size. In order to understand the reason, the following table shows average connection and tail energy costs of all three network interfaces:

| Meidum | Connection Energy (J) | Tail Energy |
|---|---|---|
| EDGE | 0.346 | 2.987 |
| 3G | 2.331 | 10.752 |
| Wi-Fi | 0.132 | 0.166 |

The connection and tail energy of 3 G were much higher than EDGE, while the transfer energy was lower. Hence for small data packets 3 G, consumed more energy than EDGE. As the data packet size increased beyond 400 KB, the transfer energy dominated the overall energy costs and hence 3 G consumed less energy than EDGE.

Computation Costs

Mobile applications may need complex computations to be performed on sensor and other data. For instance, application sensor data may be used to detect whether a user is walking, running, or driving. Such context monitoring may require running complex signal processing algorithms on the sensor data to detect user state. The choice of whether to perform the user state detection on the mobile phone or on the back-end depends on the total energy cost, taking several factors into account. In one experiment, a user state detection algorithm was run that used ECG and ACC data collected over a 10 minute interval to detect user state.

Figure 6:
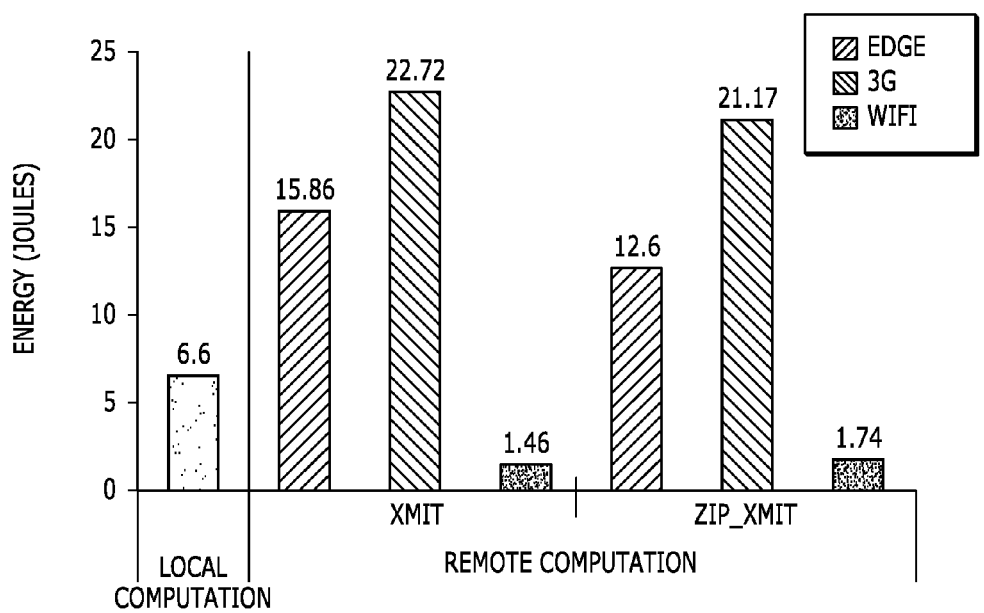
FIG. 6 shows energy cost of performing one particular computation function for local and remote computation.

FIG. 6 shows energy cost of a computation for local and remote computation. The first bar in the graph shows the energy cost of local computation. The second set of three bars show the transmission cost to enable data analysis on the remote server using three different transfer options: EDGE, 3 G and Wi-Fi. The last set of 3 bars show the energy cost when data is compressed and then transmitted.

The local computation cost was 6.6 Joules. The remote computation cost (without Gzip) varied between 1.46 Joules using Wi-Fi up to 22.72 Joules using 3 G. When using Gzip compression first, and then transmit compressed data, the energy cost varied between 1.74 Joules using Wi-Fi up to 21.17 Joules using 3 G. When Wi-Fi was available, it was energy efficient to perform remote computation. But when the user was roaming, local computation was better than EDGE or 3 G cost.

Even in this simple scenario, the choice of remote versus local computation was a complex function of the wireless radio being used and whether or not data is compressed. If the same user state detection algorithm was run using fewer or more sensor samples, the computation costs may have differed. Hence, there may be no single statically best choice when it comes to trading off energy costs of computation with communication.

The discussion may be simplified by showing the data on a single mobile device. But mobile sensing applications may be developed to run on multiple devices where the energy tradeoffs vary from one device to another. Hence, the application developer may not even be motivated to consider all the tradeoffs on a single device since these tradeoffs change with the device. Thus, tracking these tradeoffs may be kept outside of the mobile sensing application layer. Rather, these tradeoffs may be managed automatically at runtime where the most accurate information regarding energy consumption can be collected in a device-specific manner.

The previous discussion motivated energy consumption tradeoffs between sensing, computation and communication. Given the complex dynamic tradeoffs, it may be unrealistic to expect software developers to worry about these tradeoffs during mobile application development. The energy conservation module 103 may solve this problem. As indicated, the energy conservation module 103 may include the runtime middleware 107 layer that abstracts the complexity and provides a set of APIs to the application developer. The APIs can be used by application developers to obtain system services in an energy efficient manner, such as obtaining GPS information, deciding whether to run a computation locally or remotely, or deciding which available wireless access point to use to send data packets over the network. The energy conservation module 103 may monitor the various energy tradeoffs at runtime and dynamically select the most energy efficient implementation to provide the necessary functionality. The developer may be relieved of the need to understand the underlying hardware architecture and the corresponding energy tradeoffs thereby improving software productivity while still achieving significant energy savings.

Another Embodiment of Energy Conservation Module

Figure 7B:
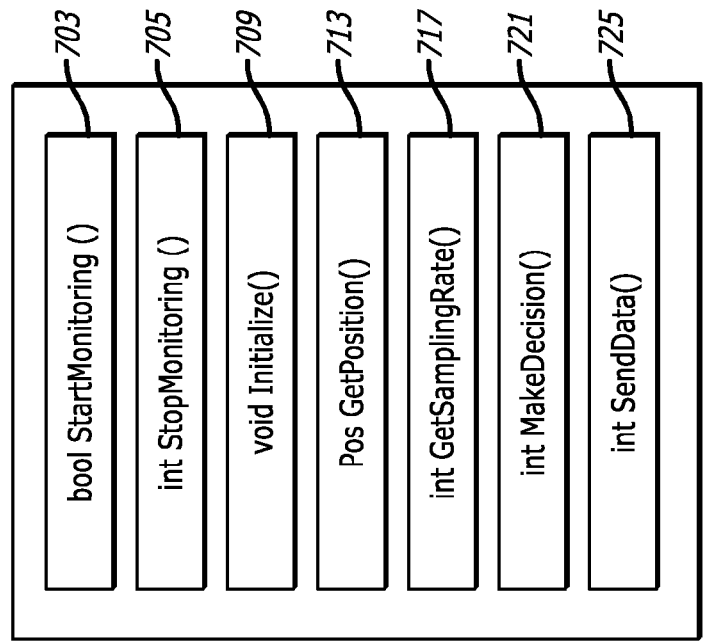
FIGS. 7A and 7B show components and APIs, respectively, of another example of the energy conservation module.
Figure 7A:
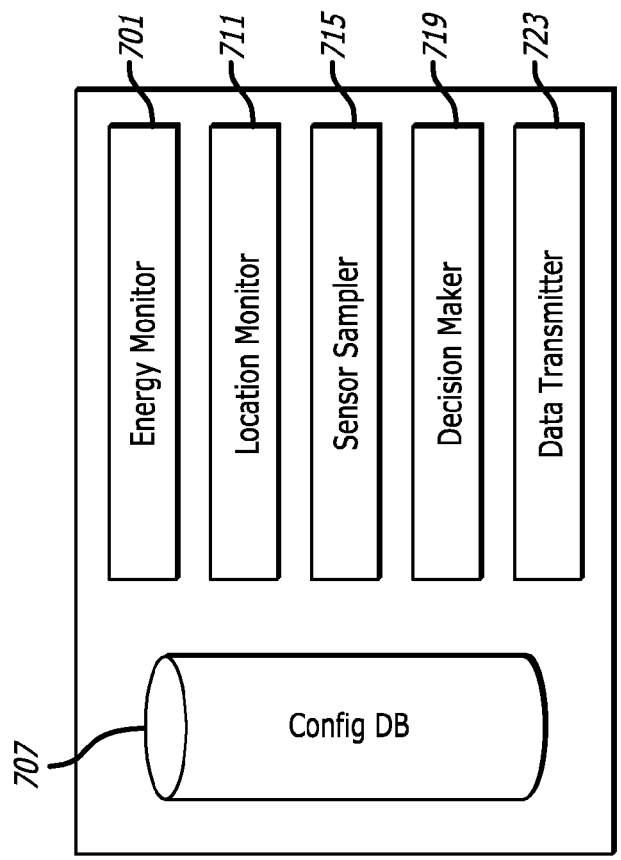

FIGS. 7A and 7B show components and APIs, respectively, of another example of the energy conservation module 103. As shown in FIG. 7B, several API functions may be provided to the designer to access the energy conservation module 103 functionality. All of these APIs, for example, may be implemented within a C++ class. But for simplicity, the pseudo code is shown as if they are C functions.

An energy monitor module 701 may measure the current energy consumption by using device-specific energy measurement interfaces. For instance, Nokia N95 provides a Nokia Energy Profiler that allows an application to measure the energy consumption during a given time interval. Two APIs may be provided for accessing the energy monitor module.

First, a StartMonitoring( ) API 703 may start a thread in the energy monitor 701 to measure energy consumption while running a mobile application. It may return true if it succeeds in starting the energy measurement, otherwise it returns false.

Second, a StopMonitoring( ) API 705 may stop the monitoring thread and returns the total energy consumed in Joules (rounded to the nearest integer) from the time the StartMonitoring API 703 is invoked until the time StopMonitoring API 705 is invoked.

A configuration database 707 may store several configuration parameters related to determining the communication and computation energy tradeoffs within a mobile sensing application. The parameters stored in the database may include the energy cost of compressing sensor data, data compression ratio for sensor data, transmission energy per byte, and connection and tail energy for various network interfaces on board the mobile device. Some of these parameters may be position-dependent, such as transmission energy. But other parameters, such as compression energy and compression ratio, may be position-independent. So the configuration database 707 may have two logical partitions. One partition may store position-independent parameters, while the second partition may store position-dependent parameters.

The first step in using this embodiment of the energy conservation module 103 within any mobile application may be to populate this database with application-specific information that can be statically measured for that application. So every application may call an Initialize(function*, byte[ ], int) API 709: This function may take as input a sampled sensor data packet (an array of bytes) collected by the application, the primary computational function (passed as a function pointer) that analyzes the sensor data. The sensor data collected during the first time quantum of application execution may be used to initialize the database. The initialize API may compute the energy cost of several data manipulation functions that are independent of position. First, it may measure the energy cost of compressing the sample sensor data packet. Second, it may measure the compression ratio of the sample data packet. Then, it may invoke the user-defined function to analyze the sample sensor data packet. The energy cost of executing the user-defined function locally on the mobile phone using the sample sensor data may be calculated. Initialize API may then record the compression energy, compression ratio, and local computation cost in the configuration database 707 as position-independent information.

A location monitor module 711 may monitor users location and provide location to multiple applications, thereby effectively enabling location sharing amongst applications. A single API may be provided to access this module, a GetPosition( ) API 713: The current GPS coordinates of the device may be provided using the most energy efficient method. The GetPosition API 713 may first scan Wi-Fi access points and compare the current Wi-Fi access points with previously collected access point information. If the scanned access point information differs by more than 20% compared to the old access point information, the system may assume that the user has moved, otherwise the system may assume that the user has not moved. If the user has moved, then the actual position information may be obtained by accessing the energy intensive GPS sensor. If the user has not moved, then the last GPS position may be provided as the current GPS position. The current Wi-Fi scan information may then be stored for future comparison. The choice of 20% is experimentally determined in this study. Instead of determining this information a priori, it is also possible to dynamically compute how much change in Wi-Fi scan is necessary before determining whether a user has moved or not.

The following procedure shows an example of internal implementation details of how position information may be determined in an energy efficient manner:

---

Procedure 1 GetPosition( )

---

Output: position information
    $AP_{scan} \Leftarrow$ ScanWi-Fi( )
    if diff($AP_{curr}, AP_{scan}$) > 20% then
        POS $\Leftarrow$ GetPositionFromGPS( )
        MOVED $\Leftarrow$ true
    else
        MOVED $\Leftarrow$ false
    $AP_{curr} \Leftarrow AP_{scan}$
    return POS

---

This API may use a variable called POS which may save the most recently collected position information from the GPS sensor. The GetPosition API 713 may first scan Wi-Fi access points and store the access point information in APscan variable. The variable APcurr may store the list of Wi-Fi access points from the previous time GetPosition information was invoked. If APscan differs by more than 20% from APcurr, then it may be assumed that the user has moved to a new position; otherwise, it may be assumed that the user has not changed position from the last time GetPosition API 713 was invoked. GetPositionFromGPS function may be called only when the actual GPS sensor is accessed. The POS variable may be updated with the new position information obtained from GPS. This API may use Network Based GPS for implementing GetPositionFromGPS function; as described earlier, Network GPS may be the least energy consuming of the various GPS functions that are available on the Nokia E75 phone. This API may also update a global variable called MOVED to true whenever position information is obtained from GPS.

A sensor sampler module 715 may automatically determine the best sensor sampling rate to meet an application's demand. The energy conservation module 103 may use a simple feedback controller mechanism to determine the best sampling rate. The sensor sampling module 715 may provide one API to access its functionality, GetSamplingRate( ) API 717: The GetSamplingRate API may provide the best sampling rate to achieve a desired level of accuracy. The feedback controller may initially allow a sensor to sample data at the highest sampling rate. The highest sampling rate data may be used to compute the analysis function output. The energy conservation module 103 may then use only half of the sampled data, by skipping every other sample collected, to compute the new analysis function output. In this implementation, the analysis function output may be assumed to be user state detection. Hence, if the reduced sampling rate still predicts the same user state as was done with higher sampling, then the API may inform the application layer to use a reduced sampling rate.

For some analysis functions, the notion of similarity may not be easily determined. But it may be relatively easy to use a training run where the sampling module can learn the similarity information. In this implementation, the detected user state detection may be used for similarity comparison.

A decision maker module 719 may inform the application when it is energy efficient to use local computation and when it is better to perform the user-defined function on a backend server, while taking into account the energy costs for communication. If remote computation is suggested, the module may suggest whether or not to use Gzip compression and the most energy efficient network interface to transmit the sensor data for remote computation. A MakeDecision(byte[ ], int, Address) API 721 may provide access to the decision maker module 719. This function may take as input sensor data set, data length and the address of the back-end server.

The following procedure shows an example of a pseudo code implementation of this API:

---
Procedure 2 MakeDecision(byte[ ],int,Address)
---

Input: function pointer data, len, addr
Output: true or false
    pos ← GetPosition( )
    if MOVED = true then
        $AP_{avail}$ ← GetAvailable($AP_{curr}$)
        $EPF_{avail}$ ← ActiveEnergyProfile($AP_{avail}$,data,len,pos,addr)
    EnergyEstimate($EP_{avail}$, len)
    $EP_{min}$ ← MIN($EP_{avail}$)
    SetDefaultNetwork($EP_{min}$)
    if $LOCAL_e > EP_{min}, E_{expected}$ then
       return false
    else
       return true

---

The mobile application typically collects sensor data for some amount of time and analyzes the sensor data at the end of the epoch to take application-specific action. Before invoking the application-specific analysis function in the energy conservation module 103, the application developer may invoke the MakeDecision API 721. The MakeDecision API 721 may first invoke the GetPosition API 713 to get current position. If MOVED is true, then it may obtain all available network interfaces as measured by the GetPosition API 713 and stored in APcurr. It may then call ActiveEnergyProfile function which may implement a profiling strategy. An example of code for ActiveEnergyProfile is shown in the following procedure:

---
Procedure 3 ActiveEnergyProfile(AccessPoint[ ],....)
---

Input: $AP_{list}$, data, int, pos, addr
Output: list of EnergyProfile
    EnergyProfile[ ] $EP_{list}$
    for i = 1 → size of $AP_{list}$ do
       EP ← retrieve EnergyProfile from Config DB with
       $AP_{list}$[i] and pos
       if EP = NULL then
          EP ← measure transmission cost of $AP_{list}$[i] using
          data and addr then create an EnergyProfile
          instance
          record set of (EP,pos) in Config DB
       add EP to $EP_{list}$
    return $EP_{list}$

---

The ActiveEnergyProfile may first accesses the configuration database 707 by using the current position as an index to obtain position-dependent data. The configuration database 707 may return a configuration parameter record if there is a record associated with the current location coordinates. Otherwise, it may return NULL data. Once NULL data is received, then ActiveEnergyProfile may split the sensor data packet into multiple smaller data chunks. It may then send the first data chunk to the destination IP by using the first access points in the APcurr vector. It may measure the connection, tail, and transmission costs using the StartMonitoring API 703 and the StopMonitoring API 705. The ActiveEnergyProfile may send the second data packet using the next available access point in the APcurr vector and measures the energy costs for this new access point at this location. The profiling process may be repeated for all access points and each access point may be used to send one chunk of the data. The access points may include all Wi-Fi channels, as well as 3 G and EDGE networks, if they are available. For each of the access points (including 3 G and EDGE) it may store the connection, tail, and transmission cost/byte in the configuration database 707 indexed by the position information as a single profile record, labeled as EnergyProfile in the procedure set forth immediately above. The access points at a given location may be sorted based on the total energy consumed by each access point at that location. In essence, the EnergyProfile record at a given location may show in sorted order how much energy is consumed by each access point during the profiling phase.

The ActiveEnergyProle may in itself be an energy intensive profiling operation. Hence, whenever there are too many access points in the APcurr vector, a simple heuristics of signal strength may be used to prune the search space to just the top four access points. Studies showed that users mobility patterns are fairly repetitive and there is even high predictability in mobility patterns. Hence, after a few days of system operation, the ActiveEnergyProfile may rarely need to do a comprehensive profiling analysis.

Once the configuration database 707 returns the profile record, then the MakeDecision API 721 may find the lowest energy option using the EstimateEnergy function. The EstimateEnergy function may access the configuration database 707 to obtain position-independent configuration parameters, namely compression ratio and compression energy costs and local energy costs. It may then estimate the energy cost of compressing the sensor data, as well as the expected size of compressed data based on compression ratio information stored in the database. Finally, it may estimate the transmission cost by using the minimum EnergyProfile (EPmin)

obtained from ActiveEnergyProfile, for both compressed and uncompressed data. The function may then find the minimum of local computation energy cost, transmission energy cost without compression, sum of compression cost and compressed data transmission cost. Based on the results it returns true when local computation is more energy efficient. It returns false when remote computation is more energy efficient.

A data transmitter module 723 may send data to a destination using the network interface selected by the decision maker module 719. It may also monitor the energy cost of the current data transmission and then update the configuration database 707 with the measured connection, tail, and transmission costs at the current GPS location. It may provide a single API, a SendData(byte[ ], int, Remote Addr) API 725: This function may take the data packet provided and transmit the data to the remote server using the selected network interface and compression configuration specified by the MakeDecision API 721. The MakeDecision API 721 may set $EP_{min}$, including Gzipflag variables. If Gzipflag is true, then the MakeDecision API 721 may estimate that it is better to compress data and then transmit. Hence, the SendData API 725 may automatically read this flag and send either compressed data or uncompressed data using the network interface specified by AP inside $EP_{min}$. Once the data is transmitted, it may also monitor the actual energy consumed and update the configuration database 707 with the computed values for connection, tail, and transmission costs. An example of pseudo code for this API is shown in the following procedure:

---
Procedure 4 SendData(byte[ ], int, Address)
---

Input: data, len, addr
Output: the number of bytes sent
    if $EP_{min}$, $Gzip_{flag}$ = true then
      StartMonitoring( )
      $Gzip_{ratio}$ ← len/Gzip(data, $data_{comp}$, len)
      $Gzip_e$ ← StopMonitoring( )
      $Gzip_{length}$ ← len
      record [$Gzip_{ratio}$, $Gzip_e$, $Gzip_{len}$] in Config DB
      StartMonitoring( )
      $len_{sent}$ ← return value after sent data using system APIs
      StopMonitoring( ) then update $EP_{min}$ with measured energy cost
      return $len_{sent}$ Impact of Using Energy Conservation Module A mobile application was selected that was a location-aware physical activity detection system, referred to herein as KNOWME. KNOWME collected sensor data from an external ECG sensor connected over Bluetooth to a Nokia E75 mobile phone. In addition to ECG data, KNOWME also collected accelerometer (ACC) sensor data from the built-in accelerometer sensor on the mobile phone. The data from the two sensors was streamed once every second to the mobile phone. In the KNOWME setup, ECG generated 300 sample per second. However, these sensor samples were internally buffered in the sensor and bulk transmitted over the Bluetooth channel. Although ECG generated 300 samples, it only transmitted 4 packets per second over the Bluetooth channel to the mobile phone. Each packet had 75 sensor samples. The accelerometer data from the phone was also collected at the rate of 300 samples per second. The baseline version of KNOWME also collected GPS position information using Network-based GPS once every 10 minutes for location-awareness.

Every two minutes KNOWME used the sensor data from ECG and ACC to perform activity detection; about 100 KB of data was collected from the two sensors combined per every two minutes. In particular, it used multi-modal signal processing to classify user state into one of nine activities, such as walking, fidgeting, running, from a combination of ECG and ACC data. Using multiple sensors may be much more effective in activity classification than just using accelerometer data alone. The activity detection can be done either locally, on the phone, or remotely on the server.

FIGS. 8A-8C show processes that three different versions of the KNOWME application implemented, KNOWME local, KNOWME remote, and KNOWME with using an embodiment of the energy conservation module 103 shown in FIG. 1.

FIG. 8A illustrates KNOWME local where the activity classification was done locally on the phone (also once every two minutes). In this case the sensor data was analyzed on the mobile phone itself. Then the activity was is stored on the mobile phone, along with the location stamp obtained from the GPS sensor.

In the second version, KNOWME-remote, the application always uses remote computation to perform activity detection. The flow chart of the steps are shown in FIG. 8B. KNOWME scanned for Wi-Fi access point availability. If there was a Wi-Fi access point available, it used Wi-Fi to transfer data to the backend server for computation and received the activity classification from the backend. If no Wi-Fi was available, it used the cellular network to transmit the data to the backend and received the activity classification from the backend. The classified activity was stored on the mobile phone with the location stamp obtained from the GPS sensor. This information stored on the mobile phone was used to provide continuous feedback to the user regarding their activity level.

The energy conservation module-enhanced implementation of KNOWME is shown in FIG. 8C. At the start of KNOWME operation, a single call to Initialize API was made to compute the position-independent configuration parameters, such as compression ratio, compression energy, and the local computation cost for processing two minutes of sample data. As described earlier, Initialize 709 automatically stored the parameters in the configuration database 707 maintained internally within the energy conservation module 103 framework. After the initialization phase, KNOWME collected sensor data just as in the baseline. But before analyzing the sensor data (also once every two minutes) KNOWME called the MakeDecision API 721. The MakeDecision API 721 returned the decision on whether to compute locally or to use remote computation for activity classification. The MakeDecision API 721 determined position-specific energy costs for data transmission, with and without Gzip, and decided whether to use local or remote computation. In addition, the MakeDecision API 721 automatically selected the minimum energy network interface in the energy profile when multiple access points were available. Based on the MakeDecision API's return value, KNOWME performed local or remote computation. If remote computation was preferred, KNOWME sent data using the SendData API 725, which automatically selected data compression, if needed, and also sent the data using the minimum energy network interface, as determined during the MakeDecision API 721 call. KNOWME received predicted user activity from the server. Then it obtained position information by invoking the GetPosition API 713 which returned position information in an energy efficient manner. The location-aware activity information was stored on the mobile phone.

GPS sensor data was only collected once every 10 minutes while activity was classified once every two minutes. Hence, only one in every five activity classifications had a potentially new GPS location.

Using the energy conservation module 103, an implementation energy savings came from multiple optimizations: First, the energy conservation module 103 skipped GPS sensing whenever the user has not moved noticeably. Second, it dynamically decided whether to use local or remote computation based on the expected energy consumption costs. Third, the energy conservation module 103 selected the minimum energy network interface at any given location, as long as a profile for that location existed. In the absence of prior profile information, the energy conservation module 103 spent some additional energy to collect and store the position-dependent profile information.

The sampling rate for external sensors in KNOWME was currently not programmable. Hence, the external sensor sampling rate was not optimized in the current KNOWME. The Symbian S60 does not allow user level access for selecting EDGE or 3 G network. Hence, the EDGE network was not selected, even when EDGE used less energy in some cases where the data packet size is small. The system always ended with 3 G during system operation, whenever cellular network was selected.

Visual Demonstration of Energy Conservation Module

Three scenarios of KNOWME operation may be compared: (1) an energy conservation module 103-based implementation of KNOWME; (2) KNOWME-remote that selected remote computation only (with Wi-Fi given priority over 3 G); and (3) KNOWME-local that selected local computation. The data was collected by running KNOWME on the E75 mobile phone using the three operational modes, described above. Three users, each running one of the three KNOWME versions, moved through identical paths during deployment study. During the field trial, the users moved through an environment where first only 3 G cellular connectivity (and hence no Wi-Fi connectivity) was available. Then one Wi-Fi access point and 3 G connectivity were available. Finally two Wi-Fi access points and 3 G connectivity were available.

Figures 9A, 9B, 9C:
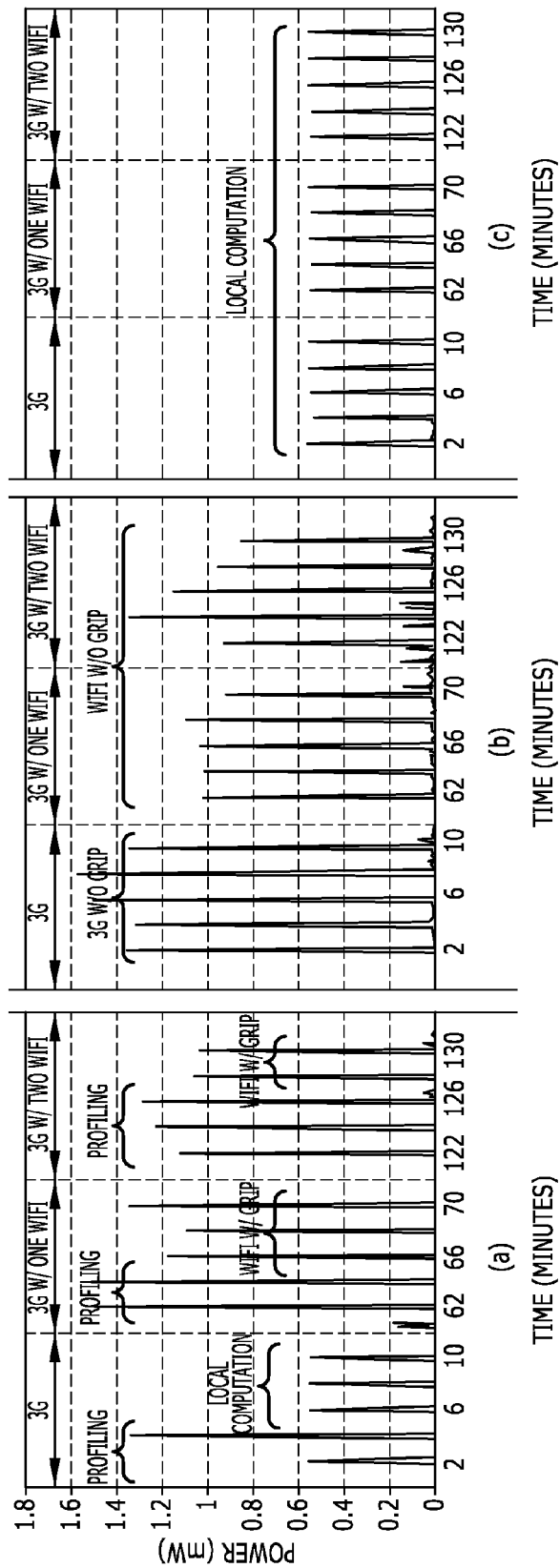
FIGS. 9A-C show power consumption variations using the energy conservation module under different network availability conditions.

FIGS. 9A-9C show how power consumption varies with time with three different approaches during a multi-hour field study. Only the first 2+ hours of time-varying behavior is shown. The X-axis is time in minutes and the Y-axis is the average power consumption computed over a one second time window. The Y-axis is power consumption (not energy consumption), so power (height of the bars) is multiplied with time (width of the bars) to obtain energy consumption.

FIG. 9A shows the power consumption variations using the energy conservation module 103. At the start, the user was roaming outside of any Wi-Fi access point availability. Hence, only 3 G network connectivity was available. The first spike in power consumption occurred when the system called the Initialize API 709 using the first two minutes worth of sensor data. The Initialize API 709 computed the energy cost of using local computation to detect user state. At minute four, KNOWME then called the MakeDecision API 721. Since no profiling information was available, KNOWME collected profile information for all available network access points. In this case, just the 3 G network was available. Hence, the first two power spikes were essentially measuring the energy cost of local computation and remote computation using 3 G. The energy consumption cost of local computation was less than the energy cost of remote computation. Hence, at minute six, KNOWME invoked the MakeDecision API 721 call which instructed KNOWME to use local computation. This process continued until minute 60.

At minute 60, the user entered into a new environment where a single Wi-Fi access point was available (the access point was detected by a Wi-Fi scan done at the start of analysis function). Now, KNOWME had five choices: local computation, remote computation using Wi-Fi with and without Gzip, and remote computation using 3 G with and without Gzip. KNOWME invoked the MakeDecision API 721 since the user had entered a new location where no profiling information was available. The MakeDecision API 721 then entered a new profile phase and sent data over 3 G and Wi-Fi access points with and without compression to compute the energy cost. Even though the profiled energy cost of sending data over 3 G was computed already in the first hour, the 3 G energy costs varied dynamically. Hence, the MakeDecision API 721 simply computed the profiling cost of 3 G-based remote computation every time the user moved to a new location. Local computation cost was already known and hence no profiling information was gathered for local computation. The new profiling phase generated two power spikes as shown at minute 62 and 64 on the figure. At minute 66, the energy conservation module 103 had all the necessary information to select the best energy efficient operation point. It selected Wi-Fi with Gzip compression. The power consumption for Wi-Fi was slightly higher than local computation, but a Wi-Fi computation took a shorter amount of time. Hence, the total energy cost of Wi-Fi with Gzip was lower than all other available options. Hence, KNOWME operated in this mode until minute 120.

At minute 120 the user had entered into a new environment where two Wi-Fi access points were available in addition to 3 G. In the experimental setup, one of the two Wi-Fi access points was set to have a lower available bandwidth. Since the user had entered a new location with no profiling information, the energy conservation module 103 entered a profiling phase. The new profiling phase generated three power spikes; one at minute 122 where energy conservation module 103 was profiling using Wi-Fi access point 1, a second one at minute 124 with Wi-Fi access point 2, and a third one at minute 126 using 3 G. All three profiles compared the cost with and without compression. At minute 126, the energy conservation module 103 had all the necessary information to select the best energy efficient operation point. It selected Wi-Fi access point 1 with Gzip compression as the best option and the system then operated in that mode.

FIG. 9B shows the power consumption for the same 2+ hour window as was shown for the energy conservation module 103 operation. The system used remote computation only, but gave priority to Wi-Fi where available. Hence, during the first hour when no Wi-Fi was available, it used 3 G without compression. In the second and third hour, it used Wi-Fi without compression to perform remote computation. When multiple access points were available, the system simply used the Wi-Fi access point with the best signal strength. Signal strength alone may not be the best indicator of energy consumption costs, but in the absence of any run time infrastructure the baseline system simply relied on signal strength alone.

FIG. 9C shows the power consumption for the same 2+ hour window as was shown for energy conservation module 103 operation. But the system now used local computation only. FIG. 9C demonstrates how using the energy conservation module 103 dynamically adapted to changing conditions. In the experimental run, the cost of profiling varied from about 10 joules to 17 joules per profile run (depending on the number of access points), which was only a small fraction of the total operational energy of the KNOWME mobile application.

Accumulated Energy Savings from Two Field Studies

Two field studies were also conducted that each lasted 9 hours. In the first field study, the user stayed in a 3 G-only environment for one hour, then moved to a 3 G plus one Wi-Fi access point environment in the second hour, then moved to 3 G+ two Wi-Fi access points environment in the third hour. Then the user repeated the movement through these three environments for two additional times for a total of 9 hours.

Figure 10:
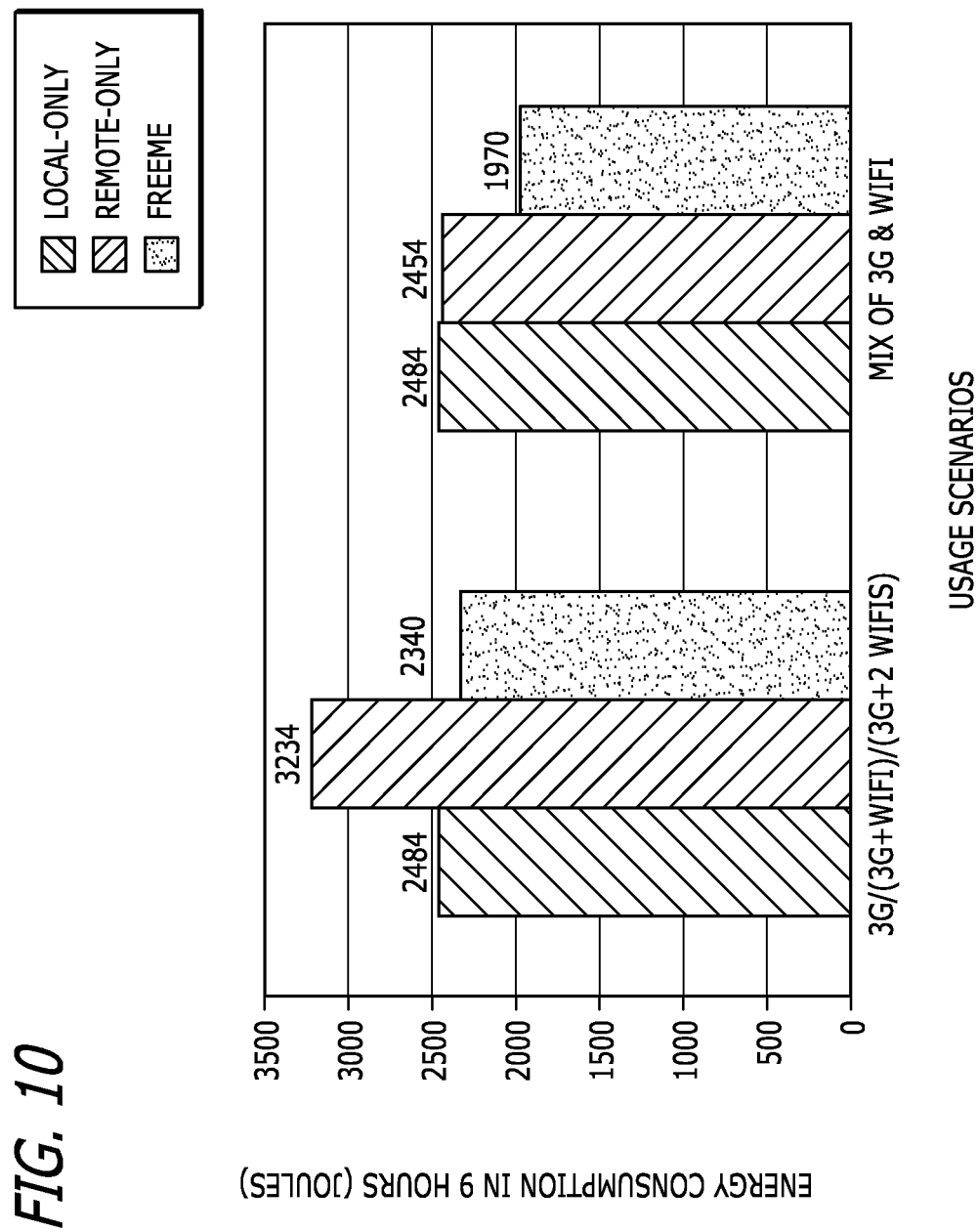
FIG. 10 illustrates accumulated energy consumptions over a time interval of 9 hours for one activity classification computation.

FIG. 10 illustrates an accumulated energy consumptions over a time interval of 9 hours using this field study. The first set of three bars show the total energy consumed by local-only, remote-only with priority to Wi-Fi access, and when using the energy conservation module 103. When using the energy conservation module 103, the KNOWME application system consumed 6% less energy than local-only computation, and consumed 28% less energy than remote-only computation. The energy savings over local computation were obtained because whenever Wi-Fi was available, the energy conservation module 103 determined that it was better to do remote computation by transmitting compressed data using Gzip. The energy savings over remote computation were obtained because remote computation using 3 G was worse than doing local computation.

The 9 hour study was repeated with a different environment, where the user moved through an environment with different Wi-Fi access points and 3 G network availability throughout the day. This was a fairly realistic environment, at least in daily living, with no assumptions regarding user mobility. The second set of three bars in FIG. 10 show the energy consumption from this field study. When using the energy conservation module 103, KNOWME consumed 20% less energy than remote-only computation, and 21% less energy than local-only computation. Here the availability of Wi-Fi for a large fraction of time during the day made remote computation perform almost as well as the local-only computation. However, the energy conservation module 103 implementation still outperformed the local-only or remote-only choices. These improvements were achieved, even with a strong baseline where remote-only computation already switched between Wi-Fi and 3 G.

Other Applications

The energy conservation module 103 may be used in conjunction with a broad variety of mobile application, such as crowd-sourcing and health monitoring. These applications may require significant improvements in energy efficiency from every aspect of mobile computing, sensing, computation, and communication. For instance, the energy conservation module 103 may be used in mobile devices that are deployed to assist in physical rehabilitation, obesity monitoring, and assisted living. The energy conservation module 103 may also be used with wireless sensor networks, such as operating in-field.

One or more of the following references may provide details about certain of the components or process steps described herein:

T. Abdelzaher, Y. Anokwa, P. Boda, J. Burke, D. Estrin, L. Guibas, A. Kansal, S. Madden, and J. Reich. Mobiscopes for human spaces. Pervasi P. Aghera, T. Rosing, D. Fang, and K. Patrick. Poster abstract: Energy management in wireless healthcare systems. In Proceedings of Information Processing in Sensor Networks, pages 363 {364, April 2009)

A. Balasubramanian, R. Mahajan, and A. Venkataramani. Augmenting mobile 3 g using wifi. In Proceedings of the international conference on Mobile systems, applications, and services, pages 209-222, 2010

N. Balasubramanian, A. Balasubramanian, and A. Venkataramani. Energy consumption in mobile phones: a measurement study and implications for network applications. In Proceedings of ACM SIGCOMM conference on Internet measurement conference, pages 280-293, 2009

S. Consolvo, D. W. McDonald, T. Toscos, M. Y. Chen, J. Froehlich, B. Harrison, P. Klasnja, A. LaMarca, L. LeGrand, R. Libby, I. Smith, and J. A. Landay. Activity sensing in the wild: a field trial of ubifit garden. In Proceeding of SIGCHI conference on Human factors in computing systems, pages 1797-1806, 2008

I. Constandache, S. Gaonkar, M. Sayler, R. R. Choudhury, and O. Cox. Energy-efficient localization via personal mobility profiling. In Proceedings of Annual International Conference on Mobile Computing, Applications, and Services, 2009

E. Cuervo, A. Balasubramanian, D.-k. Cho, A. Wolman, S. Saroiu, R. Chandra, and P. Bahl. Maui: making smartphones last longer with code offload. In Proceedings of the international conference on Mobile systems, applications, and services, pages 49, 62 (2010)

D. Cu_, M. Hansen, and J. Kang. Urban sensing: out of the woods. Commun. ACM, 51:24{33, March 2008

E. Jovanov, A. Milenkovic, C. Otto, and P. de Groen. A wireless body area network of intelligent motion sensors for computer assisted physical rehabilitation. Journal of NeuroEngineering and Rehabilitation, 2(1):6, 2005

P. Juang, H. Oki, Y. Wang, M. Martonosi, L. S. Peh, and D. Rubenstein. Energy-efficient computing for wildlife tracking: design tradeoffs and early experiences with zebranet. In Proceedings of the international conference on Architectural support for programming languages and operating systems, pages 96{107, 2002

M. Li, V. Rozgic and, G. Thatte, S. Lee, A. Emken, M. Annavaram, U. Mitra, D. Spruijt-Metz, and S. Narayanan. Multimodal physical activity recognition by fusing temporal and cepstral information. Neural Systems and Rehabilitation Engineering, IEEE Transactions on, 18(4):369 {380, August 2010

E. Miluzzo, N. D. Lane, K. Fodor, R. Peterson, H. Lu, M. Musolesi, S. B. Eisenman, X. Zheng, and A. T. Campbell. Sensing meets mobile social networks: the design, implementation and evaluation of the cenceme application. In Proceedings of the ACM conference on Embedded network sensor systems, pages 337{350, 2008

A. J. Nicholson and B. D. Noble. Breadcrumbs: forecasting mobile connectivity. In Proceedings of the ACM international conference on Mobile computing and networking, pages 46{57, 2008

N. Noury. Ailisa: experimental platforms to evaluate remote care and assistive technologies in gerontology. In Enterprise networking and Computing in Healthcare Industry, 2005. HEALTHCOM 2005. Proceedings of 7th International Workshop on, pages 67 {72, June 2005

J. Paek, J. Kim, and R. Govindan. Energy-efficient rate-adaptive gps-based positioning for smartphones. In Proceedings of the international conference on Mobile systems, applications, and services, pages 299{314, 2010

F. Qian, Z. Wang, A. Gerber, Z. Mao, S. Sen, and O. Spatscheck. Profiling resource usage for mobile applications: a cross-layer approach. In Proceedings of the international conference on Mobile systems, applications, and services, pages 321{334, 2011

M.-R. Ra, J. Paek, A. B. Sharma, R. Govindan, M. H. Krieger, and M. J. Neely. Energy-delay tradeoffs in smartphone applications. In Proceedings of the international conference on Mobile systems, applications, and services, pages 255{270, 2010

M.-R. Ra, A. Sheth, L. Mummert, P. Pillai, D. Wetherall, and R. Govindan. Odessa: enabling interactive perception applications on mobile devices. In Proceedings of the 9th international conference on Mobile systems, applications, and services, pages 43{56, 2011

E. Shih, P. Bahl, and M. J. Sinclair. Wake on wireless: an event driven energy saving strategy for battery operated devices. In Proceedings of the annual international conference on Mobile computing and networking, pages 160{171, 2002

K. Shilton. Four billion little brothers?: privacy, mobile phones, and ubiquitous data collection. Commun. ACM, 52:48{53, Nov. 2009. [21] M. Shin, P. Tsang, D. Kotz, and C. Cornelius. Deamon: energy-efficient sensor monitoring. In SECON '09, pages 565{573, 2009

D. Siewiorek, A. Smailagic, J. Furukawa, N. Moraveji, K. Reiger, and J. Shaffer. Sensay: A context-aware mobile phone. pages 248{249. IEEE Computer Society, 2003

A. Silberstein, R. Braynard, and J. Yang. Constraint chaining: on energy-efficient continuous monitoring in sensor networks. In SIGMOD '06, pages J. Sorber, N. Banerjee, M. D. Corner, and S. Rollins. Turducken: hierarchical power management for mobile devices. In Proceedings of the international conference on Mobile systems, applications, and services, pages 261 {274, 2005

L. Stabellini and J. Zander. Energy efficient detection of intermittent interference in wireless sensor networks. In International Journal of Sensor Networks, 8(1), 2010

G. Thatte, M. Li, S. Lee, E. Adar, S. Narayanan, U. Mitra, D. Spruijt-Metz, and M. Annavaram. Knowme: An energy-efficient and multimodal body area sensing system for physical activity monitoring. In To appear in ACM Transactions on Embedded Computing Systems (TECS), 2011

M. A. Viredaz, L. S. Brakmo, and W. R. Hamburgen. Energy management on handheld devices. Queue, 1(7):44{52, 2003

Y. Wang, B. Krishnamachari, Q. Zhao, and M. Annavaram. Markov-optimal sensing policy for user state estimation in mobile devices. In Proceedings of the International Conference on Information Processing in Sensor Networks, pages 268-278, 2010

Y. Wang, J. Lin, M. Annavaram, Q. Jacobson, J. Hong, B. Krishnamachari, and N. Sadeh. A framework of energy efficient mobile sensing for automatic user state recognition. In Proceedings of the International Conference on Mobile Systems, Applications, and Services, pages 179-192, 2009

The mobile communication device 101 and the energy conservation module 103 may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the device, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the entire energy conservation module may be implemented as a user-level library that each application can selectively use in its compilation. In such a case, the library does not have to be included as middleware on a phone. Rather each application can decide whether or not to use the library during its compilation process.

A request for data processing from one of the application programs 117, such as a dynamic method call, may require the use of state information to perform the request. The energy conservation module 103 may be configured to determine the minimum portion of this state information that would need to be transferred to an external data processing system for the request to be performed by the external data processing system. The energy conservation module 103 may be configured to make this minimum portion determination only once for each application program and to store the determination as metadata that is associated with each application program.

The energy conservation module 103 may be configured to use the determined minimum portion of state information when determining whether performing a request that requires this state information is likely to consume the least amount of energy if substantially performed by the data processing system 113 within the mobile communication device 101 or by the external data processing system. If the energy conservation module 103 determines that performance of the request with the minimum portion of state information is likely to consume the least amount of energy when substantially performed by the external data processing system, the energy conservation module 103 may be configured to only deliver that minimum portion of the state information to the outside data processing system, along with the request.

The energy conservation module 103 may be configured to perform this process recursively when a request that requires state information for processing invokes another request that also requires state information.

The energy conservation module 103 may also be configured to receive from the external data processing system any updates to the state information that performance of the request(s) by the external data processing system results in and to update the state information in the mobile communication device accordingly.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents.

The absence of these phrases in a claim mean that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. An energy conservation module in a battery-powered mobile communication device for maximizing the energy efficiency of the mobile communication device while running one or more application programs that communicate data over a computer network that is outside of the mobile communication device via one of different, selectable computer network interfaces within the mobile communication device, each selectable computer network interface having a configuration that communicates data over the computer network over a wireless communication pathway that is different for each selectable computer network interface, the energy conservation module including computer hardware and software having a configuration that implements the following process:
   receives requests from each of the application programs, each request calling for data communication over the computer network; and
   for each received request:
      determines which of the selectable computer network interfaces that are operational at the time of receiving the request is likely to consume the least amount of energy handing the data communication that is called for by the request; and
      causes the requested data communication to take place via the computer network interface that is determined likely to consume the least amount of energy handling the data communication.

2. The energy conservation module of claim 1 wherein:
   the mobile communication device includes a data storage system having a configuration that stores information indicative of the energy consumption rate of each of the selectable computer network interfaces; and
   the energy conservation module has a configuration that examines the stored information when determining which of the selectable computer network interfaces is likely to consume the least amount of energy.

3. The energy conservation module of claim 1 wherein the determining of which of the selectable computer network interfaces is likely to consume the least amount of energy takes into consideration the current status of one or more operating conditions that vary over time.

4. The energy conservation module of claim 3 wherein the operating conditions includes information indicative of the current response time or available data bandwidth or network congestion of each of the currently operational computer network interfaces.

5. The energy conservation module of claim 1 wherein the mobile communication device includes an operating system and the energy conservation module includes middleware positioned between the operating system and the applications.

6. The energy conservation module of claim 5 wherein the middleware has a configuration that receives the requests for data communications from the application programs via one or more APIs.

7. The energy conservation module of claim 1 wherein one of the computer network interfaces includes a cellular network communication transceiver.

8. The energy conservation module of claim 1 wherein one of the computer network interfaces includes a Wi-Fi network communication transceiver.

9. The energy conservation module of claim 8 wherein one of the computer network interfaces includes a cellular network communication transceiver.

10. The energy conservation module of claim 1 wherein the mobile communication device has an operating system and the energy conservation module has a configuration that also implements the following process:
   receives requests from each of the application programs, each request calling for data processing; and
   for each received request:
      determines whether the data processing is likely to consume the least amount of energy if substantially performed by the data processing system within the mobile communication device or a data processing system outside of the mobile communication device; and
      causes the data processing to be substantially performed at the location that is determined to consume the least amount of energy.

11. The energy conservation module of claim 10 wherein:
   one of the requests requires state information to perform the request; and
   the energy conservation module determines the minimum portion of the state information that is needed to perform this request.

12. Non-transitory, tangible, computer-readable storage media containing a program of instructions configured to cause a battery-powered mobile communication device while running the program of instructions and one or more application programs that communicate data over a computer network that is outside of the mobile communication device via one of different, selectable computer network interfaces within the mobile communication device, each selectable computer network interface having a configuration that communicates data over the computer network over a wireless communication pathway that is different for each selectable computer network interface, to:
- receive requests from each of the application programs, each request calling for data communication over the computer network; and
- for each received request:
  - determine which of the selectable computer network interfaces that are operational at the time of receiving the request is likely to consume the least amount of energy handing the data communication that is called for by the request; and
  - cause the requested data communication to take place via the computer network interface that is determined likely to consume the least amount of energy handling the data communication.

13. An energy conservation module in a battery-powered mobile communication device for maximizing the energy efficiency of the mobile communication device while running one or more application programs that request data processing that can be substantially performed by a data processing system either within or outside of the mobile communication device, the energy conservation module including computer hardware and software having a configuration that implements the following process:
- receives requests from each of the application programs, each request calling for data processing; and
- for each received request and automatically without user intervention following the receipt of each request:
  - determines whether the data processing is likely to consume the least amount of energy if substantially performed by the data processing system within or outside of the mobile communication device; and
  - causes the data processing to be substantially performed by the data processing system that is determined to consume the least amount of energy.

14. The energy conservation module of claim 13 wherein:
- the module communication device includes a data storage system configured to store information indicative of the energy consumption rate of performing data processing both within and outside of the mobile communication device; and
- the energy conservation module has a configuration that examines the stored information when determining whether the data processing is likely to consume the least amount of energy if substantially performed by the data processing system within or outside of the mobile communication device.

15. The energy conservation module of claim 13 wherein the stored information includes information about the energy consumption rate of:
- the data processing system within the mobile communication device; and
- a transceiver within the mobile communication device that communicates with the data processing system outside of the mobile communication device.

16. The energy conservation module of claim 14 wherein the determining whether the data processing is likely to consume the least amount of energy if substantially performed by the data processing system within or outside of the mobile communication device takes into consideration the current status of one or more operating conditions that vary over time.

17. The energy conservation module of claim 16 wherein the operating conditions includes information indicative of the current response time of the data processing system outside of the mobile communication device.

18. The energy conservation module of claim 13 wherein the mobile communication device includes an operating system and the energy conservation module includes middleware positioned between the operating system and the applications.

19. The energy conservation module of claim 18 wherein the middleware has a configuration that receives the requests for data communications from the application programs via one or more APIs.

20. The energy conservation module of claim 13 wherein the data processing system outside of the mobile communication device is located within an Internet server.

21. The energy conservation module of claim 13 wherein:
- one of the requests requires state information to perform the request; and
- the energy conservation module determines the minimum portion of the state information that is needed to perform this request.

22. Non-transitory, tangible, computer-readable storage media containing a program of instructions configured to cause a battery-powered mobile communication device running the program of instructions and one or more application programs that request data processing that can be substantially performed by a data processing system either within or outside of the mobile communication device to:
- receive requests from each of the application programs, each request calling for data processing; and
- for each received request:
  - determine whether the data processing is likely to consume the least amount of energy if substantially performed by the data processing system within or outside of the mobile communication device; and
  - causes the data processing to be substantially performed by the data processing system that is determined to consume the least amount of energy.

* * * * *